Sept. 24, 1968   G. RODER   3,402,676
CROSS-CARRIAGE FLAME CUTTING MACHINE GUIDEWAY
Filed Sept. 22, 1966   3 Sheets-Sheet 3

United States Patent Office 3,402,676
Patented Sept. 24, 1968

3,402,676
CROSS-CARRIAGE FLAME CUTTING
MACHINE GUIDEWAY
Georg Roder, Frankfurt am Main-Fechenheim, Germany, assignor to Messer Griesheim G.m.b.H., Frankfurt am Main, Germany, a corporation of Germany
Filed Sept. 22, 1966, Ser. No. 581,267
Claims priority, application Germany, Sept. 24, 1965, M 66,757
6 Claims. (Cl. 104—140)

ABSTRACT OF THE DISCLOSURE

An upper carriage guideway for a flame cutting machine which has a guide track on its lower carriage is characterized by including a guide track having guide means in the guideway with a liquid filled tank enclosing the guide track and with a liquid impervious cover extending above the guide track and both the guide means in the tank.

This invention relates to a guideway arrangement for cross-carriage cutting machines; more particularly to the upper carriage guideway for cross-carriage flame cutting machines having a guide track on the lower carriage.

In cross-carriage flame cutting machines, the lower carriage is movable transversely to its longitudinal direction, and one or more upper carriages in a guide track perpendicular thereto can be shifted on the lower carriage. A cutting torch is sometimes mounted on this upper carriage and by means of the two carriageways, this cutting torch can be shifted orthogonally on a surface. In the cutting process, the two carriages are shifted on the guide track in accordance with whatever curve gauge is to be cut. The movement here may be effected automatically, controlled by programming or feed-back, or by hand. In this connection, it is necessary that the upper carriage be precisely conveyed on the guide track, since any lag or irregularity leads to impairment of the cutting process. If, for example, dust is deposited on the upper carriage or on the guide surface, then this dust can collect and eventually form an accumulation. When the upper carriage rolls along over this accumulation, it is raised. The result is that the cutting torch is also raised. Accordingly the distance of the cutting nozzle from the piece of metal to be worked is greater than the distance set. This adjustment is very critical in many cases, and even a small deviation from the pre-set distance can lead to considerable malfunctioning in the cutting process.

In the cutting process, substantial formations of dust, particularly of metal dust and metal ash dust, cannot be avoided. For this reason, it is recommended that the guide track be covered. Mere covering, however, does not prevent flue dust from getting in, and substantial amounts of it can also eventually collect on the guiding devices.

An object of this invention is to provide an upper carriage guideway wherein the elements making up the guide are completely sealed off from the action of external dust.

The invention is characterized by a tank which in itself may be a conventional type filled with liquid and enclosing the guide track. The tank extends above the guide means of the guide track and a closed cover impervious to liquid above the guide track extends below the guide means of the guide track within the tank. The guide elements of the guideway are thus screened off in syphon fashion from the external atmosphere and hence from the entry of dust. Through such screening, the mutual mobility of the parts is not hampered. Such a guideway is known but not for flame cutting machines.

A preferred embodiment of the invention, which is distinguished by an exceptionally simple form of construction, is characterized by a basically elongated quadrant-like bridge having a recess extending over the whole length of the bridge along one of the upper edges, in which the tank is set. Special supporting devices for the tank are then unnecessary, since these are formed by the bridge. Moreover, the tank is mounted in the recess so as to be protected, and it can easily be further protected against external influences without any great expense. This can be accomplished, for example, by a screen completely covering the tank above, and which is preferably attached along the upper edge of the recess in the bridge and overtop the free edge of the tank. Such screening insures that no large particles will fall into the tank and contaminate the liquid unnecessarily. Only flue dust can still get into the tank below the screening. The external influences of solid objects, impacts and the like, from carelessly handled work-pieces, are prevented by such screening of the tank and the sensitive guide elements.

In many cases, it is necessary to undertake maintenance measures on the guide elements, and it is also desirable in some instances to replace the upper carriage or insert additional lower carriages. In all such cases, the guide track must be accessible. The screening of this invention is no obstacle to this; it is adequately removable—in sections at least—and thus may be lifted up or swivelled on an axis along the above-mentioned upper edge of the recess.

Novel features and advantages of the present invention will become more apparent to those skilled in the art from a reading of the following description in conjunction with the accompanying drawings wherein similar reference characters refer to similar parts and in which.

Figure 1:
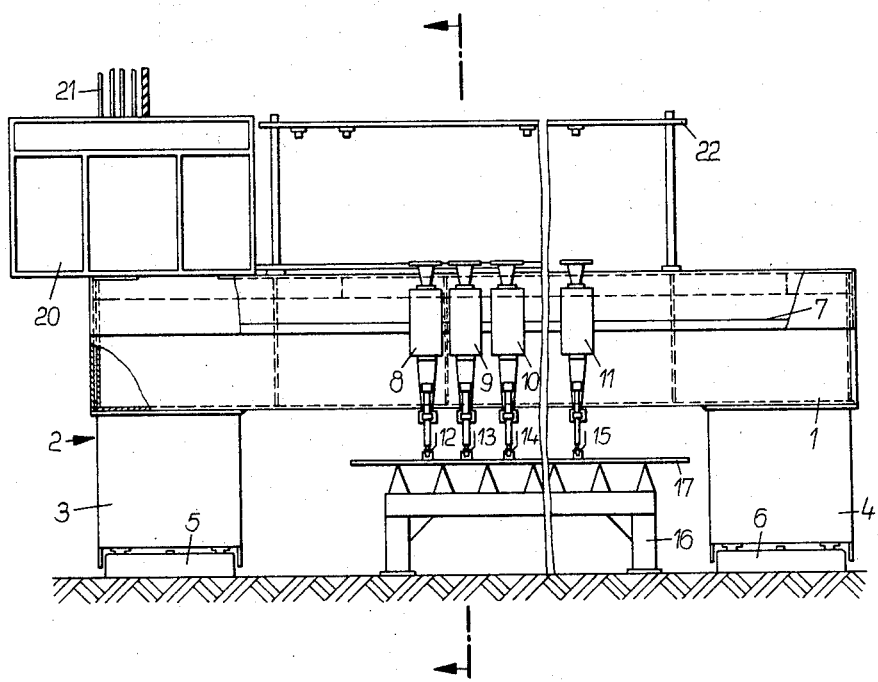
FIG. 1 is a schematic front elevational view of one embodiment of this invention.

In the drawings, the bridge of the lower carriage 1 is in the form of an elongated quadrant, generally designated by 2, and is supported on two supports 3 and 4. Both supports 3 and 4 are disposed so as to move on guideways 5 and 6, which extend perpendicularly to the plane of the drawing in FIGURES 1 and 3.

Figure 2:
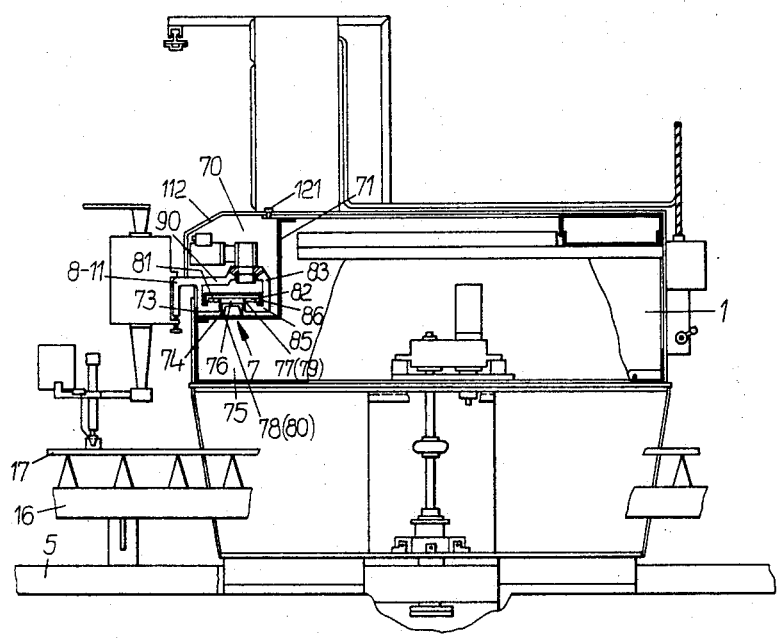
FIG. 2 is a sectional view taken through FIG. 1 along the line II—II.

Perpendicular to guideways 5 and 6, a track 7 is attached to undercarriage or bridge 2, and upper carriages 8, 9, 10 and 11 are movably mounted thereon. Upper carriage 8 is also shown in FIGURE 2 with the other upper carriages being constructed in essentially the same way. On each of the upper carriages a corresponding cutting torch 12, 13, 14 and 15 is mounted.

The cutting torches are brought over the piece of work 17 placed on the work-table 16. Guidance is effected by orthogonal coordintaion in accordance with the orthogonally disposed guide tracks 5 and 6, on the one hand, and guide 7, on the other.

Designated by 20 is an instrument board for the operation of electrical and other apparatus, some of which is located inside the bridge 1. Since the details of these devices are not necessary for an understanding of the invention, they are not shown in the drawing. Gas feeds are indicated at 21, and supports for the gas feeds and the like, which are attached to the bridge, are indicated at 22 in FIG. 1.

Figure 3:
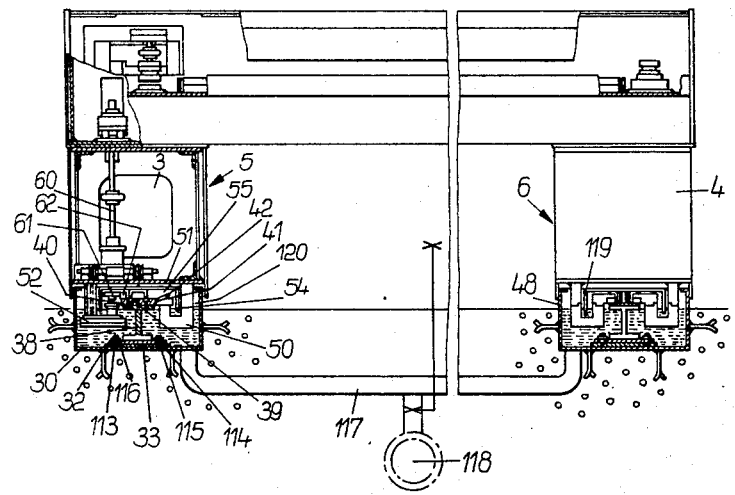
FIG. 3 is an enlarged view partly in section of the lower guide means.

The guideways 5 and 6 for the lower carriage are provided with two tanks 30 and 48 (FIG. 3) mounted parallel to each other. The tanks 30 and 48 are embedded in the floor in concrete and are imperviously sealed off against liquid on both fronts. One of the fronts is seen in FIG. 3 and is marked 120 for the left-hand guideway. Midway in guideway 5, a track 38 extending the whole length of the tank 30 is screwed in by means of set screws 113 and 114. These set screws serve to level the track 38, and for this purpose are screwed into a plate 33 welded to the tank 30 and secured by nuts 115 and 116, respectively. Additional set screws of this type are distributed over the entire length of the track and are represented by set screws 113 and 114 in FIG. 3.

The track 38 has an essentially double-T outline and has running grooves or guide means 40 and 41 opposite to each other on either side of its track head 39. Locked into these two running grooves 40 and 41 from either side are the free ball-tracks of ball segments. For the sake of clarity, however, only the ball segment 42 inserted into running groove 41 is shown for guideway 5.

Figure 4:
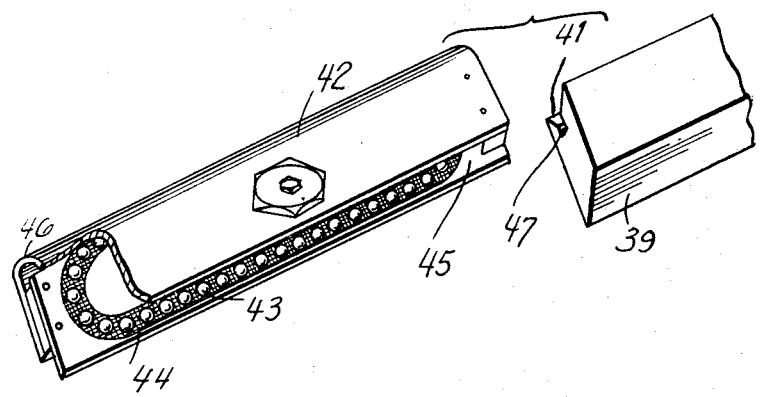
FIG. 4 is an exploded view in an enlarged scale of a portion of the apparatus shown in FIG. 3.

Such a ball segment is fashioned in the conventional way and is represented again separately in FIG. 4. FIG. 4 shows the ball segment 42 and part of the track head 39 with its corresponding running groove 41. As can be seen from FIG. 4, an elongated closed guide track 44 is provided for a series of equal-sized balls 43, in the middle of which runs a closed guide bar 45. The guide track 44 is, except for the segment just opposite the running groove 41 in FIG. 4, covered above and below the guide bar 45 by a U-shaped curved cover. In operation, this free-lying, straight guide track segment runs along the running groove 41, the projecting portion of the guide bar 45 being located in a longitudinal slot 47 at the bottom of the running groove. The balls of the ball segment rotate when the ball segment 42 is shifted relative to the track head 39 and circle into the closed guide track 44. In operation, they are protected for the greater part of their passage against the action of dust, by the cover 46. On the straight section of the guide track on which they are not protected by this cover, they are largely covered by the projecting side walls of the running groove 41. The result of this conveyance of ball segments is, since an ever increasing number of balls are in action simultaneously, both linear conveyance and simultaneous support are attained. These two guide functions are thus united in one guiding element, which is itself already largely shielded against the influence of external contamination. For this reason, ball segment guides of this type may be used advantageously in flame cutting machines.

As shown in FIG. 3, the ball segment 42 is attached to a U-shaped carrier 50, which is in turn attached to a mill bar 51. The ball segment for the opposite running groove 40 (not shown) is attached in equivalent fashion to a U-shaped carrier 52, which is likewise attached to the mill bar 51. In the interspaces left by the U-shaped construction of the two carrierse 52 and 50, projects a cover 54, which also has a U-shaped outline. The two lower edges of the cover 54 extend downward below the level of the two running grooves 40 and 41. The cover 54 extends in the cross-section shown on the left in FIG. 3 up to the two front sides of the tank 30 and is there welded so as to be impervious to liquid. The tank 30 extends considerably beyond the two running grooves 40 and 41 and is filled with liquid to the extent that the lower edges of the cover 54 dip into the surface of the liquid. In this way, there is created by the surface of the liquid, on the one hand, and by the cover 54 and the two front sides of the tank 30, an air-tight closed space 55, in which the elements sliding against each other during conveyance, viz., the two running grooves 40 and 41 and the two ball segments—segment 42 and the one not shown in the drawing—are disposed. These parts are thus shielded siphonally and hermetically from the external atmosphere and hence protected against the entry of dust. In the description of the guideway 5, mention has been made of only two ball segments opposite each other, corresponding to segment 42. There could, of course, if stability so required, be several such ball segments, disposed in series in accordance with the schematic drawing in FIG. 3. The same would apply to such ball segments as in the case of ball segment 42. The guideway 6, on the other side, is, so far as it has been described thus far, constructed essentially like the guideway 5. The two tanks 30 and 48 are joined together via a communicating conduit 117, which is attached to a common intake and discharge 118. The liquid used here is preferably water.

Since the guidance attainable with the ball segments utilized herein also insures the lower carriage 2 against angular displacement or torsion against the track, it is sufficient to provide for driving the lower carriage along the guideway from one side. In the described apparatus, driving is effected via the guideway 5. For driving, an arbor 60 mounted in the stand 3, is driven by a motor (not shown) around to the left or to the right, depending on the shift desired. This rotary movement is transmitted via various conventional driving elements along the U-shaped carrier 52 and to the pinion 61, which operates with a rack 62 attached above the track head 39 and extending along the track 38.

If the shaft or arbor 60 is rotated, then the supports or stands 3, and with it the whole lower carriage 2 is shifted against the tank 30 and the track 38, as well as the cover 54, and the corresponding parts on the other side. The two stands 3 and 4, in comparison with the longitudinal extension of the tracks, have only a very slight extension in the direction perpendicular to the plane of the drawing in FIG. 3. Thus at all settings of the lower carriage, the largest portion of the tank and the cover 54, and the covering on the other side lies free. The cover 54 and the cover 119 on the opposite side is therefore so stably constructed that it is just as accessible as the margin of the tanks 30 and 48. The service personnel can thereby gain essentially unimpeded access to the flame cutting machine through the guideways 5 and 6. The narrow apertures between the tank rims, on the one hand, and the cover, on the other, are not any great hindrance; moreover, they are appropriately dimensioned so as to be considerably narrower than a human foot.

The guideway for the upper carriage 8–11 is protected in the same way as the guideways 5 and 6, siphonally by liquid, from the external influence of dust. This can best be seen from FIG. 2. As can be seen from FIG. 2, the bridge 1 is essentially in rectangular cross-section with a recess 70 along the upper edge, facing the cutting flame, which is divided by an essentially L-shaped-section length of scrap iron 71. The lower side piece of this iron section 71 is bent upward to a partition 72, so that it forms a tank 74. This tank 74 is sealed imperviously against liquid by frontal surfaces on both front sides of the bridge 1. The front surface 75 is shown in FIG. 2. The track 7 extends through the middle of the tank 74 from one end to the other and has running grooves 77 and 78 on its track head 76 on both sides for the gearing of the balls 79 and 80 of ball segments 81 and 82. These ball segment guides are, with the exception of their dimensions, constructed just like those for the guideway of the lower carriage, with the sole difference that the ball segments for the guideways 5 and 6 are set obliquely, whereas the ball segments 81 and 82 are disposed horizontally. Several ball segments can also be arranged in series for each singly upper carriage, based on the line of sight for FIG. 2. The ball segments 81 and 82 are each attached to a U-shaped bent attachment 84, 85 of a chassis 83. In the interstice left by the U-shaped construction of the attachments 84 and 85, the bent edges of a cover 86 enter. Cover 86 is built air-tight, is attached above the track 7, extends from one front surface to the other, and is imperviously fastened to both front surfaces. The free lower edges of the cover 86 lie underneath the running grooves 77 and 78. The tank 74 is higher than the level provided by the running grooves 77 and 78. In operation, the tank is filled with liquid to the extent that the lower edges of the cover 86 dip into the liquid. In this way, there is created by the cover 86, and the two front surfaces, on the one hand, and by the surface of the liquid, on the other hand, a closed, air-tight space 90, in which the parts running against each other in the guideway, viz., the running grooves or guide means 77 and 78 and the ball segments 81 and 82 are sheltered and thus protected from the entry of dust.

Above the tank 74 a shielding 112 extends over the whole length of the tank and is attached along the upper edge of the recess 70 in the bridge 1. The shielding 112 is placed high enough so that the upper carriage 8 is partially located underneath it. The shielding oversteps the free, upward bent partition 73 of the tank 74 and hence completely covers the tank 74 above. Designated by 121 is a screw joint which serves for the dissoluble fastening of the shielding 112 to the bridge 1. If the upper carriage 8 is to be removed from the track 7, then the screw joint 121 is first loosened and the shielding 112 removed; the upper carriage 8 can then be lifted up out of the tank 64.

Obviously many modifications and variations of the above invention are possible in light of the above teachings. It is, therefore, to be understood that within the scope of the appended claims the invention may be practiced otherwise than as specifically described.

What is claimed is:

1. An upper carriage guideway in combination with a flame cutting machine having a guide track on its lower carriage, characterized in that said guideway includes a guide track having guide means, a liquid filled tank enclosing said guide track, and a liquid impervious cover member extending above said guide track and below said guide means in said tank.

2. A guideway as set forth in claim 1 wherein said cutting machine is mounted on quadrant shaped bridge, a recess being in said bridge along its entire length along one upper edge thereof, and said tank being in said recess.

3. A guideway as set forth in claim 2 wherein a shielding completely covers the top of said tank.

4. A guideway as set forth in claim 3 wherein said shielding is attached along the upper edge of said recess, and the free edge of said tank extending beyond said shielding in the front thereof.

5. A giudeway as set forth in claim 3 wherein said shielding is removable.

6. A guideway as set forth in claim 1 wherein said lower carriage track is enclosed in a liquid filled tank.

References Cited
UNITED STATES PATENTS

| | | | |
|---|---|---|---|
| 536,357 | 3/1895 | De Palacio | 104—134 |
| 476,776 | 6/1892 | Barkley | 191—26 |
| 487,735 | 12/1892 | Hayden | 191—26 |
| 3,148,632 | 9/1964 | Bingham | 105—145 |

ARTHUR L. LA POINT, *Primary Examiner.*

R. A. BERTSCH, *Assistant Examiner.*